US007949924B2

(12) United States Patent
Kim et al.

(10) Patent No.: US 7,949,924 B2
(45) Date of Patent: May 24, 2011

(54) APPARATUS AND METHOD FOR TRANSMITTING/RECEIVING HIGH SPEED SHARED CONTROL CHANNEL IN WIDEBAND WIRELESS COMMUNICATION SYSTEM

(75) Inventors: Noh-Sun Kim, Suwon-si (KR); Yong-Suk Moon, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 1198 days.

(21) Appl. No.: 11/636,916

(22) Filed: Dec. 11, 2006

(65) Prior Publication Data
US 2007/0150787 A1 Jun. 28, 2007

(30) Foreign Application Priority Data
Dec. 9, 2005 (KR) ................. 10-2005-0120344

(51) Int. Cl.
*H03M 13/00* (2006.01)

(52) U.S. Cl. .................... 714/751; 714/774

(58) Field of Classification Search .......... 714/748, 714/751; 370/229, 337, 328
See application file for complete search history.

(56) References Cited

U.S. PATENT DOCUMENTS

| 7,069,038 | B2* | 6/2006 | Hakkinen et al. | 455/522 |
|---|---|---|---|---|
| 7,116,651 | B2* | 10/2006 | Hakkinen et al. | 370/329 |
| 7,292,854 | B2* | 11/2007 | Das et al. | 455/434 |
| 7,352,722 | B2* | 4/2008 | Malladi et al. | 370/335 |
| 7,500,166 | B2* | 3/2009 | Miyazaki et al. | 714/748 |
| 7,539,917 | B2* | 5/2009 | Zhuyan | 714/749 |
| 7,564,827 | B2* | 7/2009 | Das et al. | 370/342 |
| 2003/0174662 | A1* | 9/2003 | Malkamaki | 370/310 |
| 2003/0210669 | A1* | 11/2003 | Vayanos et al. | 370/335 |
| 2005/0250497 | A1* | 11/2005 | Ghosh et al. | 455/436 |
| 2006/0077923 | A1* | 4/2006 | Niwano | 370/328 |
| 2006/0165028 | A1* | 7/2006 | Hiraki et al. | 370/328 |

FOREIGN PATENT DOCUMENTS
KR 10-2005-0098131 10/2005
* cited by examiner

*Primary Examiner* — Esaw T Abraham
(74) *Attorney, Agent, or Firm* — The Farrell Law Firm, P.C.

(57) ABSTRACT

Provided is an apparatus and method for transmitting/receiving an HS-SCCH in a wideband wireless communication system. In a method for transmitting control information in an HARQ wireless communication system, an ACK/NACK fed back from a receiver is monitored to determine if an ACK/NACK repetition factor needs to be adjusted. If the adjustment is needed, the ACK/NACK repetition factor is determined. Control information corresponding to the ACK/NACK repetition factor is transmitted to the receiver over a predetermined control channel. A Node B capable of directly detecting the uplink channel conditions, adjusts the ACK/NACK repetition factor and the adjusted ACK/NACK repetition factor is rapidly transmitted to a UE.

16 Claims, 10 Drawing Sheets

Decoding notation: m (number of multi-codes) / Δ (offset from left/right in code tree, SF=16)

| CLUSTER CODE INDICATOR (3 BITS) \ TREE OFFSET INDICATOR (4 BITS) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 (1/15) | 1/1 | 1/2 | 1/3 | 1/4 | 1/5 | 1/6 | 1/7 | 1/8 | 1/9 | 1/10 | 1/11 | 1/12 | 1/13 | 1/14 | 1/15 | 15/1 |
| 1 (2/14) | 2/1 | 2/2 | 2/3 | 2/4 | 2/5 | 2/6 | 2/7 | 2/8 | 2/9 | 2/10 | 2/11 | 2/12 | 2/13 | 2/14 | 14/2 | 14/1 |
| 2 (3/13) | 3/1 | 3/2 | 3/3 | 3/4 | 3/5 | 3/6 | 3/7 | 3/8 | 3/9 | 3/10 | 3/11 | 3/12 | 3/13 | 13/3 | 13/2 | 13/1 |
| 3 (4/12) | 4/1 | 4/2 | 4/3 | 4/4 | 4/5 | 4/6 | 4/7 | 4/8 | 4/9 | 4/10 | 4/11 | 4/12 | 12/4 | 12/3 | 12/2 | 12/1 |
| 4 (5/11) | 5/1 | 5/2 | 5/3 | 5/4 | 5/5 | 5/6 | 5/7 | 5/8 | 5/9 | 5/10 | 5/11 | 11/5 | 11/4 | 11/3 | 11/2 | 11/1 |
| 5 (6/10) | 6/1 | 6/2 | 6/3 | 6/4 | 6/5 | 6/6 | 6/7 | 6/8 | 6/9 | 6/10 | 10/6 | 10/5 | 10/4 | 10/3 | 10/2 | 10/1 |
| 6 (7/9)  | 7/1 | 7/2 | 7/3 | 7/4 | 7/5 | 7/6 | 7/7 | 7/8 | 7/9 | 9/7 | 9/6 | 9/5 | 9/4 | 9/3 | 9/2 | 9/1 |
| 7 (8/8)  | REQ | R0  | R1  | R2  | R3  | R4  | 8/7 | 8/8 | 8/1 | 8/2 | 8/3 | 8/4 | 8/5 | 8/6 | 8/7 | 8/8 |

APPARATUS AND METHOD FOR TRANSMITTING/RECEIVING HIGH SPEED SHARED CONTROL CHANNEL IN WIDEBAND WIRELESS COMMUNICATION SYSTEM

PRIORITY

This application claims priority under 35 U.S.C. §119 to an application filed in the Korean Intellectual Property Office on Dec. 9, 2005 and allocated Serial No. 2005-120344, the contents of which are incorporated herein by reference.

BACKGROUND OF THE INVENTION

1. Field of the Invention

The present invention relates generally to an apparatus and method for transmitting/receiving a High Speed Shared Control Channel (HS-SCCH) in a Wideband Code Division Multiple Access (WCDMA) wireless communication system, and more particularly, to an apparatus and method for transmitting/receiving an ACKnowledgement/Negative ACKnowledgement (ACK/NACK) repetition factor over an HS-SCCH in a WCDMA wireless communication system.

2. Description of the Related Art

Mobile communication systems have evolved from a voice-based system into a high-speed, high-quality wireless packet data transmission system for providing data service and multimedia service. Standardization work dedicated to High Speed Downlink Packet Access (HSDPA) and Evolution-Data and Voice (1xEV-DV) primarily by the 3rd Generation Partnership Project (3GPP) and 3GPP2 committees is clear evidence of efforts to find a solution to 2 Mbps or higher-speed, high-quality wireless data packet transmission in the 3rd Generation (3G) mobile communication system.

In wireless communications, the radio channel environment is an obstacle to high-speed, high-quality data service. For example, the radio channel environment often varies due to a signal power change caused by fading, shadowing, Doppler effects caused by movement of the mobile station and frequent velocity changes of the mobile station, interference from other users, and multipath interference, as well as Additive White Gaussian Noise (AWGN). Thus, it follows that an advanced technology beyond the technologies of conventional 2nd Generation (2G) and 3G mobile communication systems is needed to improve adaptability to the channel changes in order to provide high-speed wireless data packet service. Although fast power control adopted in conventional systems improves adaptability to the channel changes, the 3GPP and 3GPP2 dedicated to standardization of a high-speed data packet transmission system has commonly adopted Adaptive Modulation and Coding (AMC) and Hybrid Automatic Repeat Request (HARQ).

AMC is a scheme for changing a modulation scheme and a coding rate adaptively according to the change of a downlink channel environment. Generally, a User Equipment (UE) measures the Signal-to-Noise Ratio (SNR) of a downlink signal and reports it to a Node B (a base station). The Node B then estimates the downlink channel environment based on the SNR information and determines an appropriate modulation scheme and a coding rate of a channel encoder according to the estimation.

HARQ is a scheme of retransmitting the packet to compensate for an error, when it occurs in an initially transmitted data packet. The HARQ scheme includes Chase Combining (CC), Full Incremental Redundancy (FIR), and Partial Incremental Redundancy (PIR). In CC, the same packet as initially transmitted is retransmitted. In FIR, instead of the same initially transmitted packet, a packet having only redundancy bits generated from a channel encoder is retransmitted. In PIR, a data packet comprised of information bits and new redundancy bits is retransmitted.

While AMC and HARQ are independent techniques to increase adaptability to the change of links, a combination of AMC and HARQ can improve the system performance considerably. That is, a transmitter in a Node B determines a modulation scheme and a coding rate for a channel encoder adaptively according to the downlink channel status and transmits a data packet correspondingly. A receiver in a UE, if it fails to decode the data packet, requests a retransmission. The Node B retransmits a predetermined data packet in a predetermined HARQ scheme in response to the retransmission request.

To support the above-described schemes, a UE and a Node B need to exchange related control signals. A control channel for delivering the related control signals in an HSDPA communication system is called a High Speed Shared Control Channel (HS-SCCH). That is, the HS-SCCH delivers control signals related to a High Speed Physical Downlink Shared Channel (HS-PDSCH) for transmitting user data at a high rate.

FIG. 1 illustrates the structures of an HS-SCCH and an HS-PDSCH in a conventional HSDPA communication system.

As illustrated in FIG. 1, an HS-SCCH 110 is transmitted two slots earlier than a HS-PDSCH 120, for delivering control information necessary for demodulation of the HS-PDSCH 120.

The types of control information for supporting the demodulation of the HS-PDSCH 120 are show in Table 1 below.

TABLE 1

| 1st part | 2nd part |
| --- | --- |
| 7-bit CCS information<br>1-bit MS information | 6-bit TB size information<br>3-bit HARQ Process ID<br>3-bit RV information<br>1-bit NI<br>16-bit UE ID |

The HS-SCCH 110 comprises three slots. The first slot delivers the CCS (Channelization Code Set) information and the MS (Modulation Scheme) information, while the second and third slots deliver the TB (Transport Block) size information, the HARQ Process ID, the RV (Redundancy and constellation Version) information, the NI (New data Indicator), and the UE ID (UE Identifier). The reason for dividing the HS-SCCH slots into two parts is to rapidly acquire the CCS information and the MS information that are important for demodulation of the HS-PDSCH 120.

The control information transmitted over the HS-SCCH is now described in detail.

1. CCS Information

The HSDPA communication system uses up to 15 Orthogonal Variable Spreading Factor (OVSF) codes with a Spreading Factor (SF) of 16, which serve as channelization codes. The CCS information indicates the number of channelization codes that are used to transmit the HS-PDSCH. The CCS information is 7-bit information as shown in Table 1. Using the CCS information, a UE acquires the type and number of channelization codes necessary for despreading.

FIG. 2 is a diagram illustrating an OVSF code tree in the conventional HSDPA communication system.

As illustrated in FIG. 2, each OVSF code (channelization code) is represented as C(i, j) according to its location in the code tree. The variables i and j of C(i, j) denote an SF and a location counted from the leftmost position in the OVSF code tree, respectively. For example, C (16, 0) refers to an OVSF code with an SF of 16 at the first location from the leftmost position in the OVSF code tree.

In FIG. 2, for SF=16, the 7th to 16th OVSF codes, C(16, 6) to C(16, 15) are assigned to the HS-PDCH for HSDPA service. A plurality of OVSF codes available for the HSDPA service can be code-multiplexed for a plurality of UEs at an identical time. A Node B determines the number of OVSF codes to be allocated to each UE and the locations of the allocated OVSF codes in the code tree, and transmits the determined number and positions to the UEs over the HS-SCCH using the CCS information FIG. 3 is a diagram illustrating a CCS table for determining the number of codes used for transmission of an HS-PDSCH and the locations of the codes on a code tree in the conventional HSDPA communication system.

As illustrated in FIG. 3, a longitudinal axis index and a transverse axis index in the CCS table represent a 3-bit cluster code indicator and a 4-bit tree offset indicator, respectively. The cluster code indicator and the tree offset indictor are combined to constitute CCS information. In a unit square, an upper numeral "m" indicates the number of allocated codes and a lower numeral "Δ" indicates an offset from the left/right of the code tree. For example, "1/1" corresponds to allocation of one channelization code (i.e., the first channelization code) and "3/2" corresponds to allocation of three channelization codes (i.e., the second to fourth channelization codes).

A Node B and a UE both manage the CCS table illustrated in FIG. 3. Using the CCS table, the Node B organizes and transmits CCS information to the UE. Using the CCS information from the Node B, the UE accesses the CCS table to acquire allocated channelization codes (spreading codes).

2. MS Information

As described above, the AMC scheme adaptively changes a modulation scheme for a modulator and a coding rate for a channel encoder according to channel environments. When two modulation schemes of Quadrature Phase Shift Keying (QPSK) and 16-array Quadrature Amplitude Modulation (16QAM) are used, the Node B must inform the UE of the modulation scheme and coding rate of a current packet at each packet transmission. Because the coding rate is matched with information such as a TB set, an HS-PDSCH CCS, and an MS, the Node B has only to transmit the MS information to the UE.

3. TB Size Information

The TB size information indicates the size of a TB on a transport channel mapped to a physical channel.

4. HARQ Process ID (HAP)

HARQ is a special case of ARQ with the following two schemes introduced to increase transmission efficiency. One is to transmit a retransmission request and a response between a UE and a Node B and the other is to temporarily store data having errors and combine the data with retransmitted data at a receiver.

Meanwhile, a typical Stop And Wait (SAW) ARQ scheme allows transmission of the next packet data only when an ACK is received for the current packet data. In this case, even if the packet data can be transmitted, the ACK must be awaited.

An n-channel SAW ARQ provided to solve this problem allows transmission of successive packet data without receiving an ACK for the current packet data. That is, n time-divided logical channels are established between the UE and the Node B. The Node B informs the UE which logical channel delivers specific packet data using HARQ process information including a predetermined time slot or channel number. Using the HARQ process information from the Node B, the UE reorders in the original order packet data received at a particular point in time or soft-combines the packet data. Such HARQ process information is the HARQ process ID (HAP).

5. RV Information

Table 2 shows RV coding for 16QAM, while Table 3 shows RV coding for QPSK. The RV information includes parameters s, r and b; parameters s and r are values used for rate matching.

As shown in Table 4, parameter b is information about constellation rearrangement. A transmitter transmits a signal using one of four constellations shown in Table 4.

TABLE 2

| Xrv (value) | s | r | b |
|---|---|---|---|
| 0 | 1 | 0 | 0 |
| 1 | 0 | 0 | 0 |
| 2 | 1 | 1 | 1 |
| 3 | 0 | 1 | 1 |
| 4 | 1 | 0 | 1 |
| 5 | 1 | 0 | 2 |
| 6 | 1 | 0 | 3 |
| 7 | 1 | 1 | 0 |

TABLE 3

| Xrv (value) | s | r |
|---|---|---|
| 0 | 1 | 0 |
| 1 | 0 | 0 |
| 2 | 1 | 1 |
| 3 | 0 | 1 |
| 4 | 1 | 2 |
| 5 | 0 | 2 |
| 6 | 1 | 3 |
| 7 | 0 | 3 |

TABLE 4

| b | Output bit sequence | Operation |
|---|---|---|
| 0 | $s_1, s_2, s_3, s_4$ | None |
| 1 | $s_3, s_4, \underline{s_1, s_2}$ | Swapping MSBs with LSBs |
| 2 | $s_1, s_2, \underline{s_3}, \underline{s_4}$ | Inversion of the logical values of LSBs |
| 3 | $s_3, s_4, \underline{s_1}, \underline{s_2}$ | 1 & 2 |

6. NI

The NI indicates whether a current packet is initially transmitted or retransmitted. The NI is represented in one bit.

7. UE ID

The UE ID is specific to each UE. Using its UE ID The UE determines whether the HS-SCCH and the HS-PDSCH are allocated to it in each time slot.

The control information transmitted over the HS-SCCH is determined according to an ACK/NACK and a Channel Quality Indicator (CQI) that are fed back from a receiver. For example, when an ACK is fed back from the receiver and thus new packet data are transmitted, the NI is set to "NEW". The MS information and the CCS information are determined using the CQI fed back from the receiver.

FIG. 4 is a diagram illustrating a procedure for exchanging the control information in the conventional HSDPA communication system.

As illustrated in FIG. 4, a transmitter transmits a new packet with the NI set to "NEW". Also, using the Xrv, the transmitter informs a receiver of the parameters s, r and b used for the packet transmission.

Based on the control information from the transmitter, the receiver decodes a received packet to determine an ACK/NACK, and transmits the determination result to the transmitter over a High Speed Dedicated Physical Control Channel (HS-DPCCH).

When receiving a NACK from the receiver, the transmitter retransmits the corresponding packet with the NI set to "CONTINUE" and with the Xrv set to one of 0 to 7. On the other hand, when receiving an ACK from the receiver, the transmitter transmits a new packet with the NI set to "NEW" and with the Xrv set to one of 0 to 7.

In a predefined CQI feedback cycle (P-CQI), the receiver measures a CQI of a downlink channel to feed back the measured CQI to the transmitter. This feedback CQI is used to determine an MS and a CCS.

An ACK/NACK transmitted from a transmitter is now described in detail.

The existing 3GPP standard allows repeated transmission of an ACK/NACK up to four times. This repetition time is called an ACK/NACK repetition factor. A UE receives an HS-PDSCH packet and repeatedly transmits an ACK or a NACK by the ACK/NACK repetition factor according to whether the received packet has an error. For example, when the repetition factor is 4 and the Cyclic Redundancy Check (CRC) result on the received packet is an ACK, the UE repeatedly transmits an ACK four times during a corresponding Transmission Time Interval (TTI) and the subsequent three TTIs.

In the conventional communication system, the ACK/NACK repetition factor is transferred from a Radio Resource Control (RRC) layer of a UE to a physical layer of the UE, which is problematic because much delay is required to reflect the reception conditions in a Node B. Accordingly, is a scheme is needed for rapidly applying an ACK/NACK error or an ACK/NACK data loss, which is caused by an increased interference in an uplink and by the distortion of a radio channel, to the adjustment of the ACK/NACK repetition factor. For the rapid adjustment of the ACK/NACK repetition factor, it is desirable that the ACK/NACK repetition factor is adjusted by a Node B that can directly detect the channel conditions of an uplink, rather than by an UE. Therefore, what is required is a scheme for adjusting the ACK/NACK repetition factor at the Node B and rapidly transmitting the adjusted ACK/NACK repetition factor to the UE.

SUMMARY OF THE INVENTION

An object of the present invention is to substantially solve at least the above problems and/or disadvantages and to provide at least the advantages below. Accordingly, an object of the present invention is to provide an apparatus and method for preventing a packet loss in an HARQ communication system by efficiently transmitting control information.

Another object of the present invention is to provide an apparatus and method for determining an ACK/NACK repetition factor in an HARQ communication system by rapidly reflecting channel conditions.

A further object of the present invention is to provide an apparatus and method for sending a request for adjustment of an ACK/NACK repetition factor from a transmitter to a receiver in an HARQ communication system.

Still another object of the present invention is to provide an apparatus and method for sending, using reserved values of a CCS, a request for adjustment of an ACK/NACK repetition factor from a transmitter to a receiver in an HARQ communication system.

According to one aspect of the present invention, there is provided an apparatus for transmitting control information in an HARQ wireless communication system, the apparatus including a controller for determining ACK/NACK repetition factor information based on channel conditions; and a channel transmitter for transmitting the ACK/NACK repetition factor information from the controller to a receiver over a predetermined control channel. The ACK/NACK repetition factor information may be one of reserved values of a Caste predetermined control channel may be an HS-SCCH.

According to another aspect of the present invention, there is provided a method for transmitting control information in an HARQ wireless communication system, the method including monitoring an ACK/NACK fed back from a receiver to determine if an ACK/NACK repetition factor needs to be adjusted; if the adjustment is needed, determining the ACK/NACK repetition factor; and transmitting control information corresponding to the determined ACK/NACK repetition factor to the receiver over a predetermined control channel.

BRIEF DESCRIPTION OF THE DRAWINGS

The above and other objects, features and advantages of the present invention will become more apparent from the following detailed description when taken in conjunction with the accompanying drawings in which:

FIG. 3 is a diagram illustrating a CCS table for determining the number of codes used for transmission of an HS-PDSCH and the locations of the codes on a code tree in the conventional HSDPA communication system;

FIG. 5 is a diagram illustrating a CCS table for determining the number of codes used for transmission of an HS-PDSCH and the locations of the codes on a code tree in an HSDPA communication system according to the present invention;

DETAILED DESCRIPTION OF THE PREFERRED EMBODIMENTS

Figure 1:
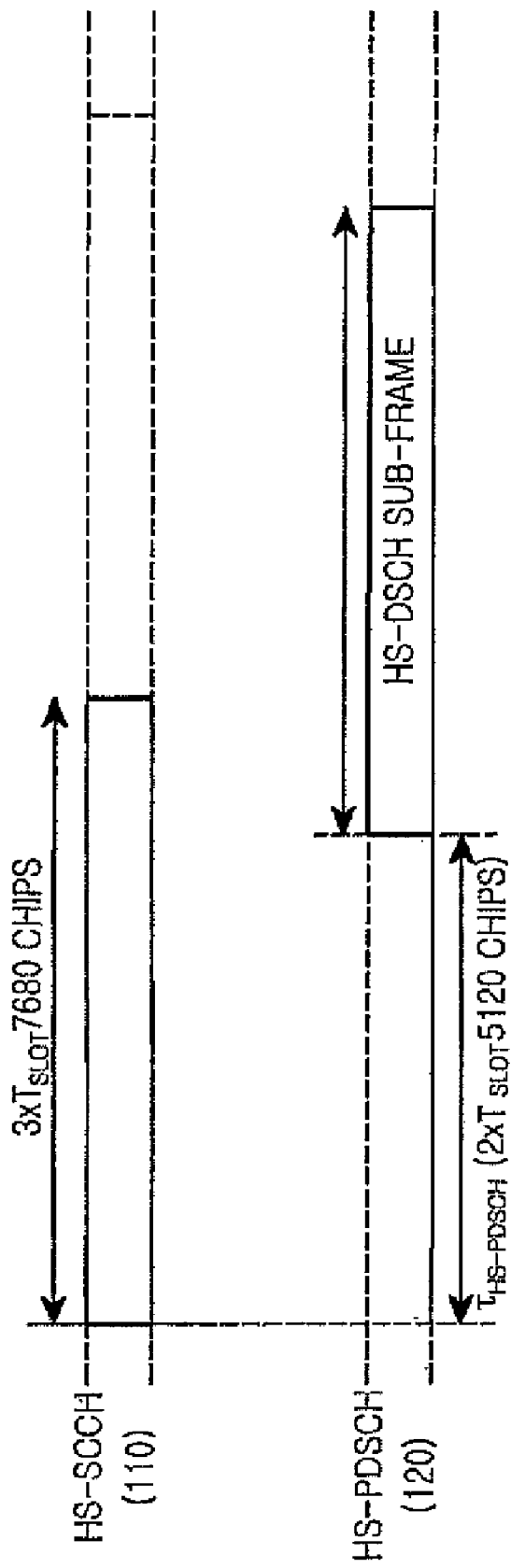
FIG. 1 illustrates the structures of an HS-SCCH and an HS-PDSCH in a conventional HSDPA communication system.
Figure 2:
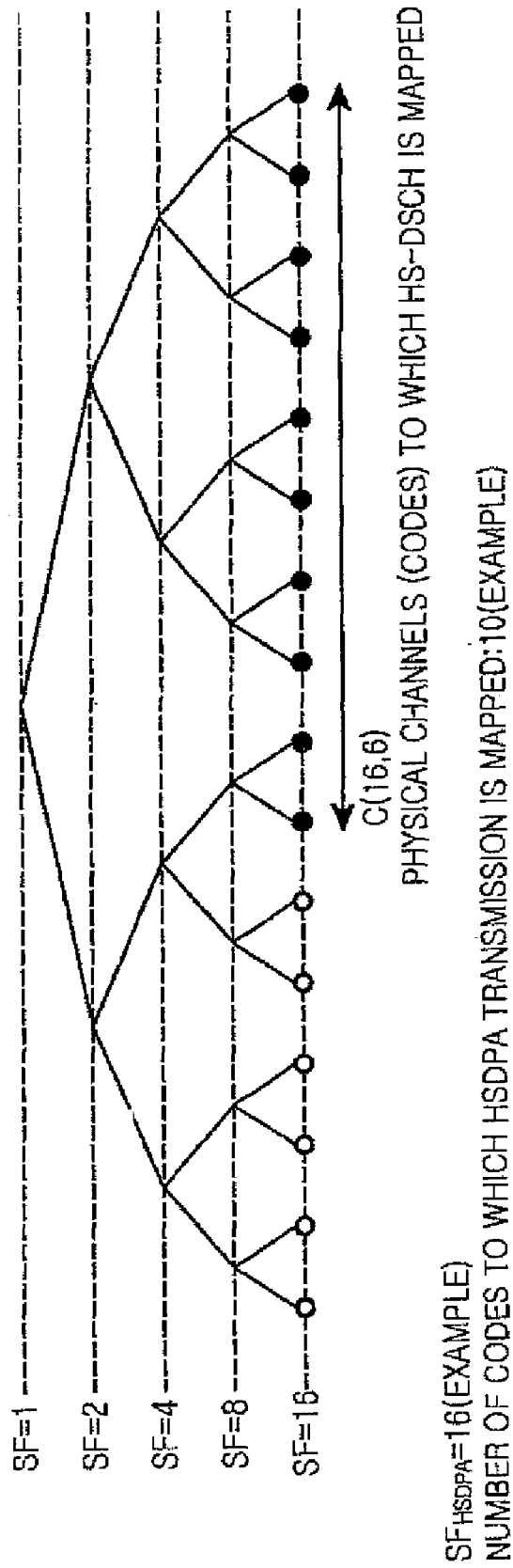
FIG. 2 is a diagram illustrating an OVSF code tree in the conventional HSDPA communication system.
Figure 4:
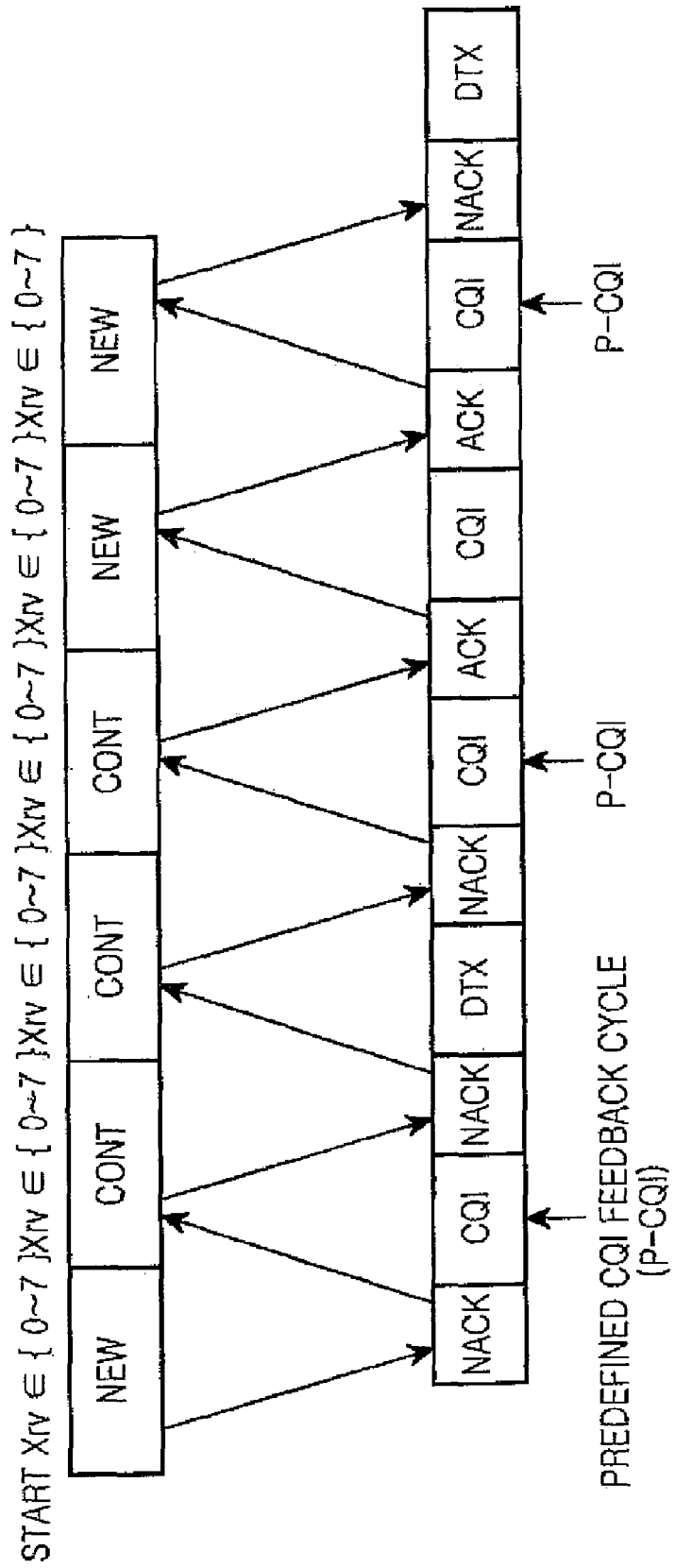
FIG. 4 is a diagram illustrating a procedure for exchanging control information in the conventional HSDPA communication system.

Preferred embodiments of the present invention will be described herein below with reference to the accompanying drawings. In the following description, well-known functions or constructions are not described in detail because they would obscure the invention with unnecessary details. Also, the terms used herein are defined according to the functions of the present invention. Thus, the terms may vary depending on a user's or operator's intention and usage. That is, the terms used herein must be understood within the context of the invention herein described.

The present invention provides a scheme for sending a request for adjustment of an ACK/NACK repetition factor from a transmitter to a receiver in an HARQ communication system, which is now described in detail.

Referring to FIG. 5, a longitudinal axis index and a transverse axis index in the CCS table represent a 3-bit cluster code indicator and a 4-bit tree offset indicator, respectively. The cluster code indicator and the tree offset indictor are combined to constitute CCS information. In a unit square, an upper numeral "m" indicates the number of allocated codes and a lower numeral "Δ" indicates an offset from the left/right of the code tree. For example, "1/1" corresponds to allocation of one channelization code (i.e., the first channelization code) and "3/2" corresponds to allocation of three channelization codes (i.e., the second to fourth channelization codes).

A Node B and a UE both manage the CCS table illustrated in FIG. 5. Using the CCS table, the Node B organizes and transmits CCS information to the UE. Using the CCS information from the Node B, the UE accesses the CCS table to acquire allocated channelization codes (spreading codes).

Figure 3:
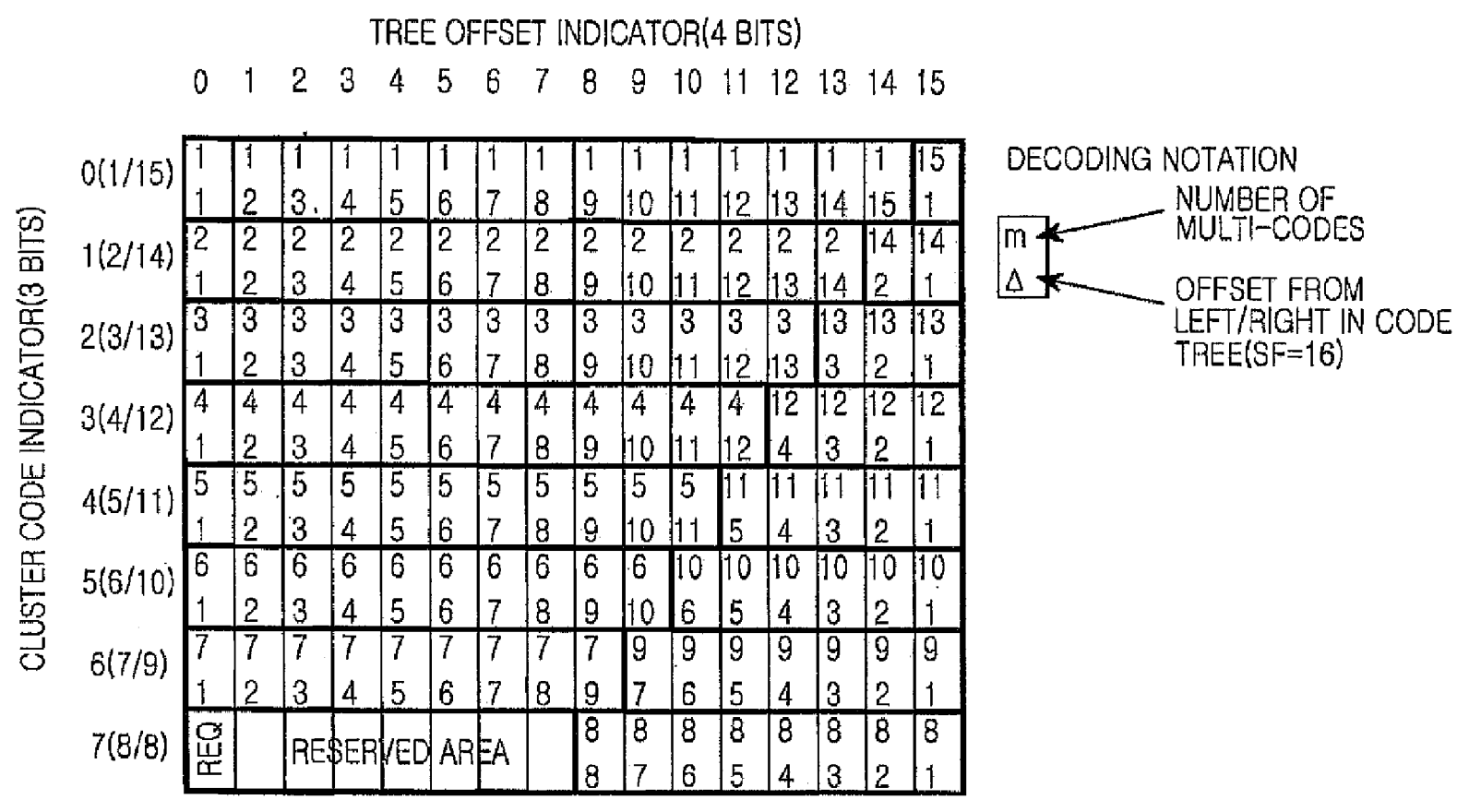

In the conventional CCS table illustrated in FIG. 3, the second to eighth fields (i.e., seven fields) in the last row are designated as reserved fields that are not used for transmission of the CCS information. The present invention provides the reserved fields which are used to transmit an ACK/NACK repetition factor. For example, as illustrated in FIG. 5, five fields R0, R1, R2, R3 and R5 among the reserved fields are used to transmit the following information.

R0: retransmit an ACK/NACK once while maintaining a current ACK/NACK repetition factor R1: change the ACK/NACK repetition factor to 1

R2: change the ACK/NACK repetition factor to 2

R3: change the ACK/NACK repetition factor to 3

R4: change the ACK/NACK repetition factor to 4

If the current ACK/NACK repetition factor is 1 and the CCS information is transmitted, the Node B transmits a corresponding ACK or NACK whenever receiving a packet. Thereafter, when detecting an ACK/NACK data bit loss or an ACK/NACK error for a predetermined time period, the Node B transmits one of the reserved fields R2 to R4 to the UE using a field that has been used to transmit the CCS information. The UE recognizes the CCS information from the Node B as an ACK/NACK repetition factor to adjust the number of times of repeated transmission of the ACK/NACK.

Figure 6:
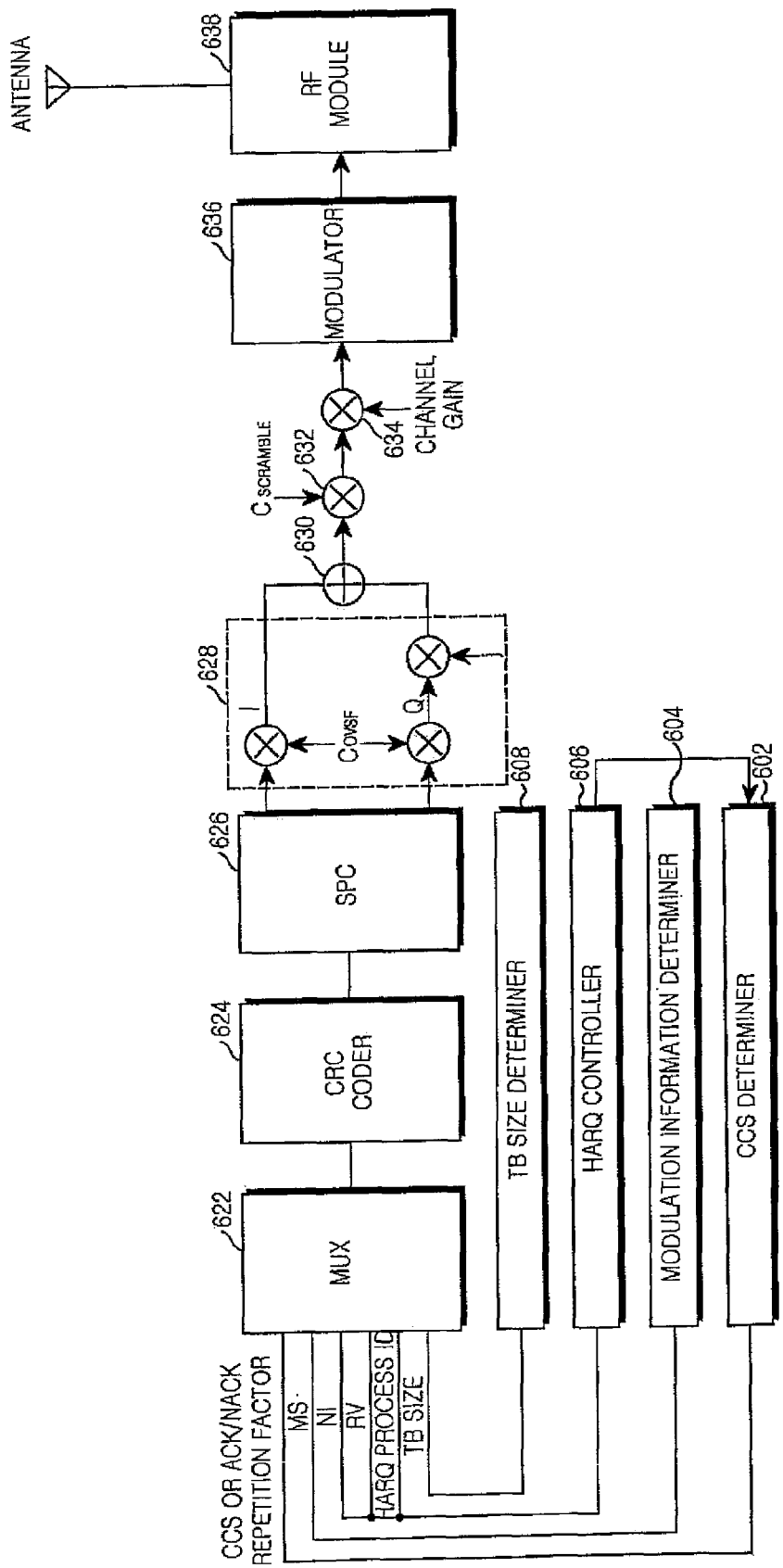
FIG. 6 is a block diagram of a transmitter for transmitting an HS-SCCH in an HSDPA communication system according to the present invention.

Referring to FIG. 6, the transmitter includes a CCS determiner 602, a modulation information determiner 604, an HARQ controller 606, a TB size determiner 608, a multiplexer (MUX) 622, a CRC coder 624, a serial-to-parallel converter (SPC) 626, a spreader 628, an adder 628, a scrambler 632, a channel gain controller 634, a modulator 636, a Radio Frequency (RF) module 638, and an antenna. The CRC coder 624, . . . , the RF module 638 correspond to a physical layer and can be collectively called "channel transmitter". The CCS determiner 602, . . . , the MUX 622 correspond to an upper layer for the physical layer and can be collectively called "controller".

The CCS determiner 602 has the CCS table illustrated in FIG. 5. The CCS determiner 602 determines a code set to be used for channelization of a packet to be transmitted over an HS-PDSCH, and generates CCS information according to the determined code set based on the CCS table. According to the present invention, the CCS determiner 602 generates repetition factor information for designating an ACK/NACK repetition, factor according to a control signal from the HARQ controller 606 based on the CCS table.

The modulation information determiner 604 determines a modulation scheme (MS) to be used for the packet to be transmitted over the HS-PDSCH. The MS may be determined by a CQI fed back from a UE.

The HARQ controller 606 processes an ACK/NACK fed back from the UE, and determines an NI, RV information, and an HARQ Process ID (HAP). According to the present invention, when the frequency of an ACK/NACK error (or loss) for a predetermined time period is greater than or equal to a predetermined threshold, or when an error (or loss) is successively detected from a predetermined number of ACK/NACK data, the HARQ controller 606 provides a control signal for changing an ACK/NACK repetition factor to the CCS determiner 602. In The ACK/NACK repetition factor is adjusted according to the error level of the ACK/NACK fed back from the UE. In another embodiment of the present invention, the ACK/NACK repetition factor may also adjusted according to the CQI fed back from the UE.

The TB size determiner 608 determines a TB size to be used for the packet to be transmitted over the HS-PDSCH.

The MUX 622 generates a bit stream in a slot format by multiplexing the CCS information (or the ACK/NACK repetition factor), the MS information, the NI, the HARQ process ID, the RV information, and the TB size information.

The CRC coder 624 attaches a (CRC) Cychic Redundancy Check code to the bit stream. The CRC may be masked with a UE ID. The SPC 626 converts the CRC-attached bit stream to parallel information bits and outputs them separately as an in-phase (I) part and a quadrature-phase (Q) part to the spreader 628.

The spreader 628 generates an I channel signal and a Q channel signal by spreading the I part and the Q part with a predetermined spreading code $C_{OVSF}$. The adder 630 adds the I channel signal and the Q channel signal and output the resulting complex signal to the scrambler 632.

The scrambler 632 scrambles the complex signal with a predetermined scrambling code $C_{Scramble}$. The channel gain controller 634 multiplies the scrambled signal by a channel gain.

The modulator 636 modulates the gain-controlled signal in a predetermined modulation scheme. The RF module 638 upconverts the modulated signal to an RF signal and transmits it through the antenna.

Figure 7:
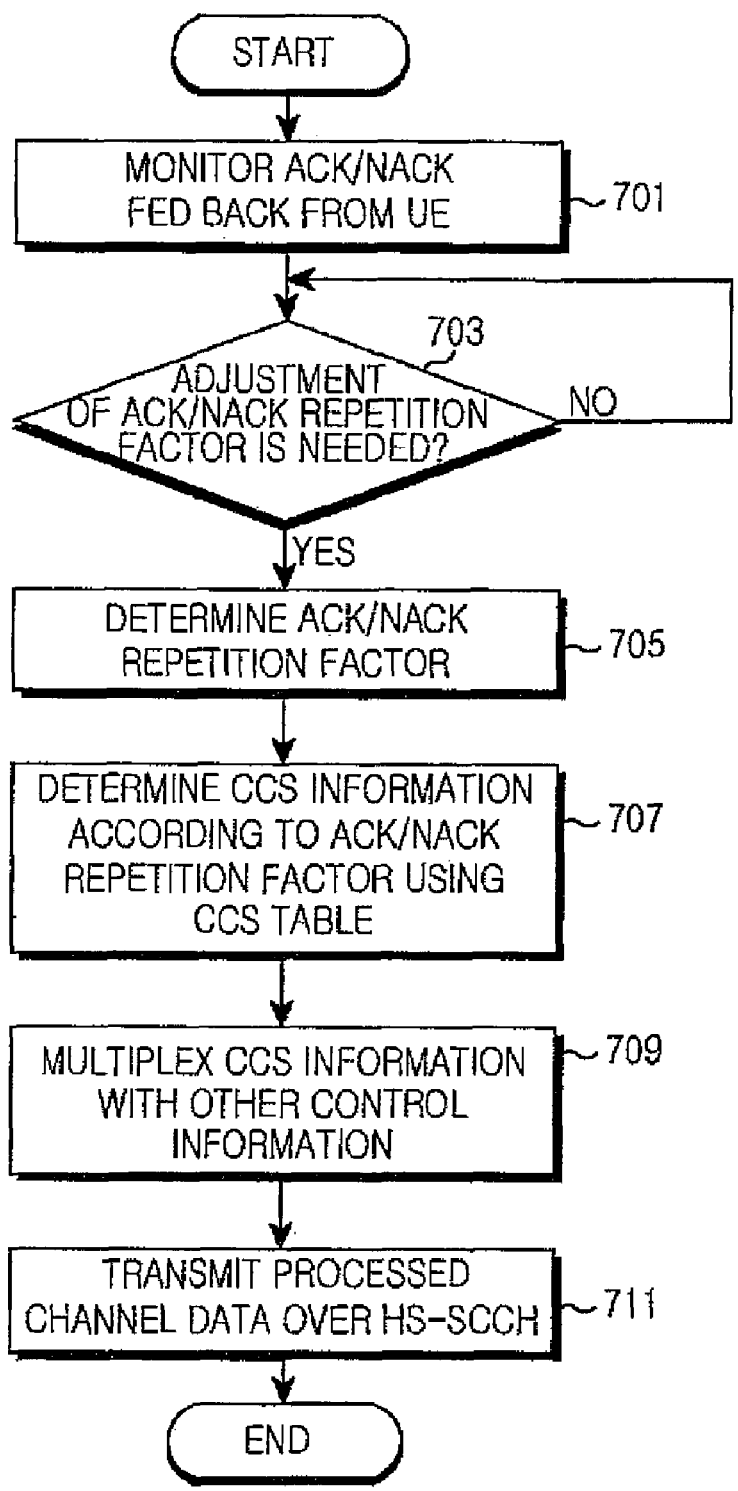
FIG. 7 is flowchart illustrating an operation of a Node B in an HSDPA communication system according to the present invention.

Referring to FIG. 7, the Node B monitors an ACK/NACK fed back from an UE, in step 701. In step 703, the Node B determines if an ACK/NACK repetition factor needs to be adjusted, based on an uplink channel state. If so, Node B proceeds to step 705, and if not, the Node B repeats step 703. In one embodiment, an ACK/NACK repetition factor is adjusted when the frequency of an ACK/NACK error (or loss) for a predetermined time period is equal to or greater than a predetermined threshold. In another embodiment, an ACK/NACK repetition factor is adjusted when an error (or loss) is successively detected from a predetermined number of ACK/NACK data. In the above embodiment, the ACK/NACK repetition factor is adjusted in the case of a poor channel state. Alternatively, the ACK/NACK repetition factor is adjusted in the case of a good channel state.

In step 705, the Node B determines an ACK/NACK repetition factor. When the ACK/NACK monitoring result indicates a poor channel state, the ACK/NACK repetition factor is increased above its current value. On the other hand, when the ACK/NACK monitoring result indicates a good channel state, the ACK/NACK repetition factor is increased below its current value.

In step 707, the Node B determines 7-bit CCS information according to the determined ACK/NACK repetition factor using the CCS table illustrated in FIG. 5.

In step 709, the Node B generates channel data by multiplexing the determined CCS information with other control information (e.g., MS, NI, RV, HAP, and TB size) to be transmitted over an HS-SCCH. In step 711, the Node B processes the channel data according to a predetermined standard and transmits the processed channel data to the UE over the HS-SCCH.

Figure 8:
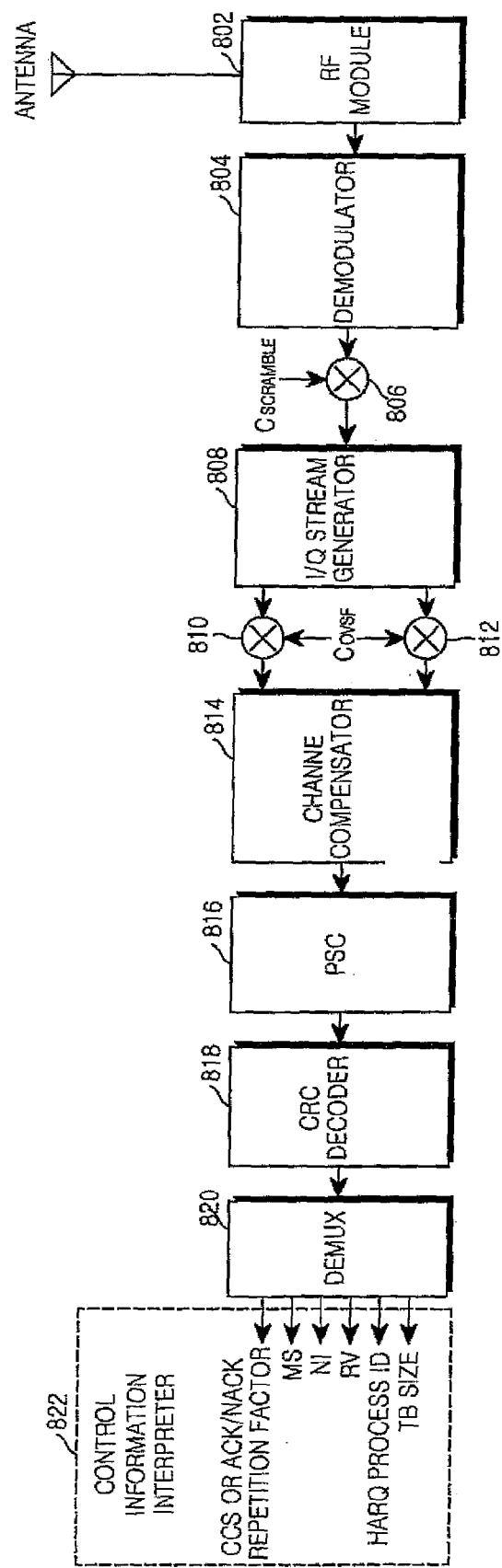
FIG. 8 is a block diagram of a receiver for receiving an HS-SCCH in an HSDPA communication system according to the present invention.

Referring to FIG. 8, the receiver includes an antenna, an RF module 802, a demodulator 804, a descrambler 806, an I/Q stream generator 808, multipliers 810 and 812, a channel compensator 814, a parallel-to-serial converter (PSC) 816, a CRC decoder 818, a demultiplexer (DEMUX) 820, and a control information interpreter 822. The RF module 802, . . . , the CRC decoder 818 correspond to a physical layer and can be collectively called "channel receiver". The DEMUX 820 and the control information interpreter correspond to an upper layer for the physical layer and can be collectively called "controller".

The RF module 802 downconverts an RF signal received through the antenna to a baseband signal. The demodulator 804 demodulates the baseband signal in accord with the modulation scheme used in the Node B.

The descrambler 806 descrambles the demodulated signal with the predetermined scrambling code $C_{Scramble}$ to output a complex signal. The I/Q stream generator 808 separates the complex signal into an I bit stream and a Q bit stream.

The multiplier 810 multiplies the I bit stream by the predetermined scrambling code $C_{OVSF}$ to output a despread signal. Likewise, the multiplier 812 despreads the Q bit stream by the predetermined scrambling code $C_{OVSF}$ to output a despread signal.

The channel compensator 814 compensates for the distortion of the despread signals caused during transmission over a radio channel. The PSC 816 serializes the compensated signals to output a serial signal.

The CRC decoder 818 checks the CRC of the serial signal from the PSC 816. If no errors are detected, the CRC decoder 818 outputs a bit stream (i.e., the serial signal minus a CRC code) to the DEMUX 820. The DEMUX 820 demultiplexes the bit stream into CCS information (or ACK/NACK repetition factor information), MS information, NI information, RV information, an HARQ process ID, and TB size information.

The control information interpreter 822 interprets the control information from the DEMUX 820 to receive a corresponding data packet. According to the present invention, using the CCS table illustrated in FIG. 5, the control information interpreter 822 determines whether received information is the CCS information (or the ACK/NACK repetition factor information). If the received information is the CCS information, spreading codes to be used for despreading the data packet are determined and provided to an HS-PDSCH receiver. On the other hand, if the received information is the ACK/NACK repetition factor information, an ACK/NACK repetition factor is determined and provided to an HS-DPCCH transmitter. Depending on the existence of a packet error, the HS-DPCCH transmitter transmits an ACK or NACK to the Node B by the determined ACK/NACK repetition factor.

Figure 9:
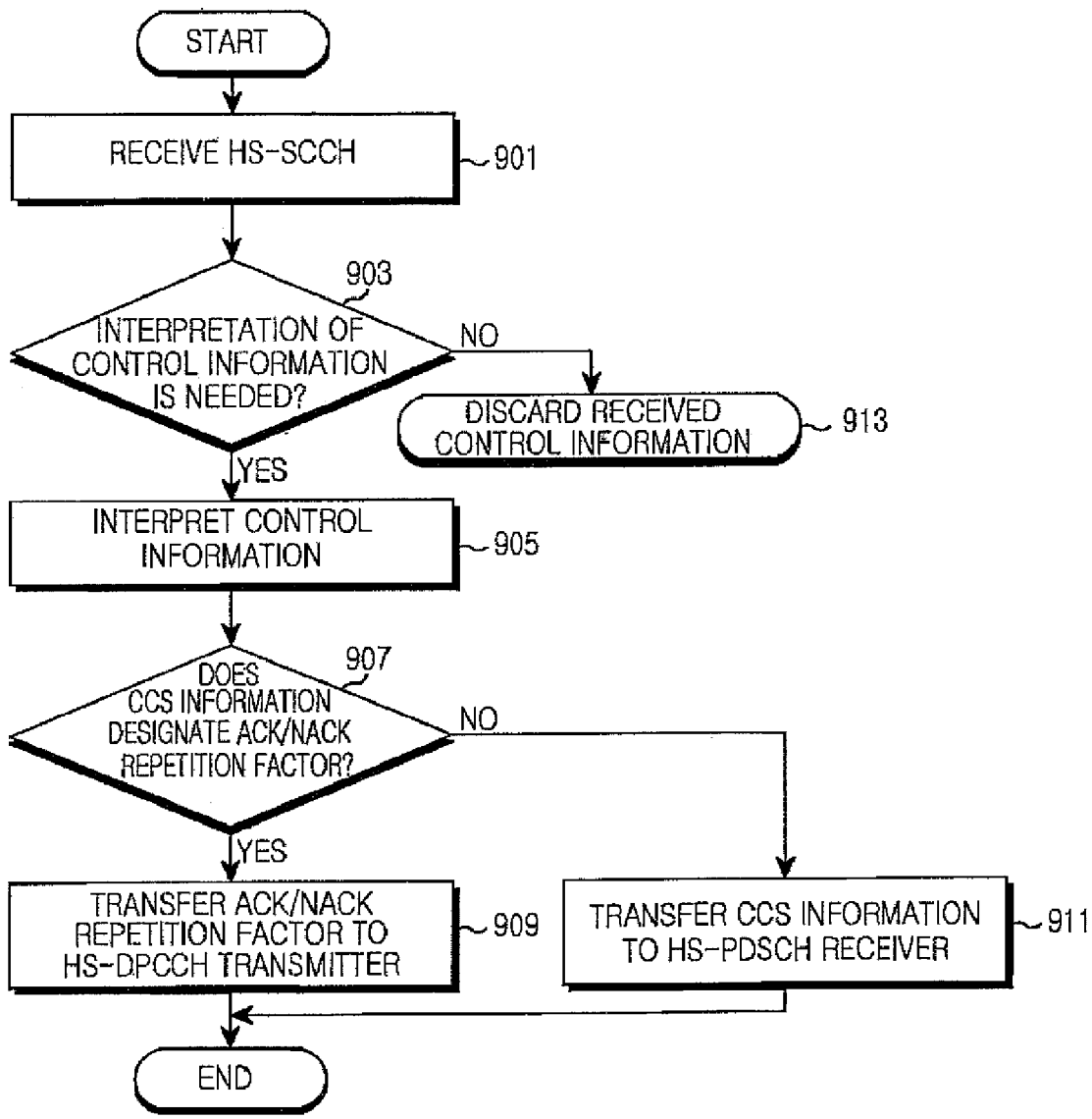
FIG. 9 is flowchart illustrating an operation of a UE in an HSDPA communication system according to the present invention.

Referring to FIG. 9, the UE receives an HS-SCCH from the Node B and acquires information data by demodulating the HS-SCCH, in step 901. In step 903, the UE checks predetermined information (UE ID) of the information data to determine if received control information needs to be interpreted. If so, the UE proceeds to step 905, and if not, the UE proceeds to step 913. At this point, the received control information is interpreted when the information data contains the UE ID of the UE.

In step 913, the UE discards the received control information. In step 905, the UE interprets the received control information. As described above, the CCS information (or the ACK/NACK repetition factor information), the MS information, the NI information, the RV information, the HARQ process ID, and the TB size information are received over the HS-SCCH, and the UE interprets such control information to perform a corresponding control (or process).

In step 907, the UE determines if the interpreted CCS information designates an ACK/NACK repetition factor, not a spreading code used in a packet. If the interpreted CCS information designates an ACK/NACK repetition factor, the UE proceeds to step 909. In step 909, the UE transfers the designated ACK/NACK repetition factor to an HS-DPCCH transmitter. Depending on the existence of a packet error, the HS-DPCCH transmitter transmits an ACK or aNACK to the Node B by the designated ACK/NACK repetition factor.

On the other hand, if the interpreted CCS information designates a spreading code set, the UE proceeds to step 911. In step 911, the UE the transfers the designated spreading code set to an HS-PDSCH receiver. The HS-PDSCH receiver despreads a received packet by spreading codes (OVSF codes) according to the designated spreading code set.

It will be understood by those skilled in the art that the above structures of the transmitter and the receiver may vary according to the standard specification or a designer's implementation.

As described above, the Node B is capable of directly detecting the uplink channel conditions, adjusting the ACK/NACK repetition factor and rapidly transmitting the adjusted ACK/NACK repetition factor to the UE. Accordingly, adaptation to channel conditions is performed in real time and thus the desired information can be acquired rapidly. Consequently, the system performance can be enhanced. In addition, the present invention makes it possible to transmit additional information (the ACK/NACK repetition factor) without changing the number of information bits and the structure of a control channel defined in the standard specification.

While the invention has been shown and described with reference to certain preferred embodiments thereof, it will be understood by those skilled in the art that various changes in form and details may be made therein without departing from the spirit and scope of the invention as defined by the appended claims.

Figure 10:
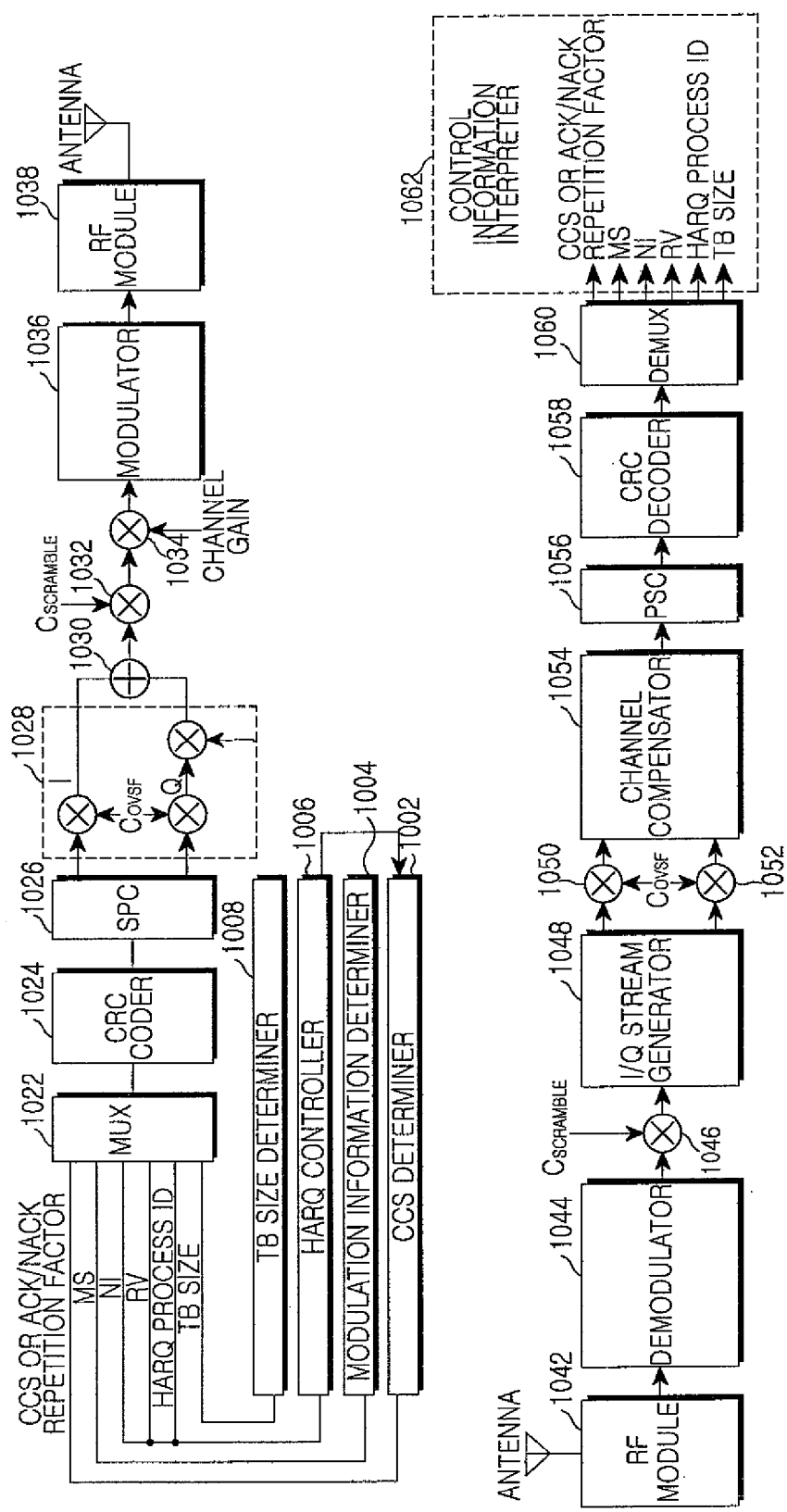
FIG. 10 is a block diagram of a wireless of communication system including the transmitter and the receiver according to the present invention.

Referring to FIG. 10, the transmitter includes a CCS determiner 1002, a modulation information determiner 1004, an HARQ controller 1006, a TB size determiner 1008, a multiplexer (MUX) 1022, a CRC coder 1024, a serial-to-parallel converter (SPC) 1026, a spreader 1028, an adder 1030, a scrambler 1032, a channel gain controller 1034, a modulator 1036, a Radio Frequency (RF) module 1038, and an antenna. The CRC coder 1024 and the RF module 1038 correspond to a physical layer and can be collectively called "channel transmitter". The CCS determiner 1002 and the MUX 1022 correspond to an upper layer for the physical layer and can be collectively called "controller".

The CCS determiner 1002 has the CCS table illustrated in FIG. 5. The CCS determiner 1002 determines a code set to be used for channelization of a packet to be transmitted over an HS-PDSCH, and generates CCS information according to the determined code set based on the CCS table. According to the present invention, the CCS determiner 1002 generates repetition factor information for designating an ACK/NACK repetition factor according to a control signal from the HARQ controller 1006 based on the CCS table.

The modulation information determiner 1004 determines a modulation scheme (MS) to be used for the packet to be transmitted over the HS-PDSCH. The MS may be determined by a CQI fed back from a UE.

The HARQ controller 1006 processes an ACK/NACK fed back from the UE, and determines an NI, RV information, and an HARQ Process ID (HAP). According to the present invention, when the frequency of an ACK/NACK error (or loss) for a predetermined time period is greater than or equal to a predetermined threshold, or when an error (or loss) is successively detected from a predetermined number of ACK/NACK data, the HARQ controller 1006 provides a control signal for changing an ACK/NACK repetition factor to the CCS determiner 1002. In The ACK/NACK repetition factor is adjusted according to the error level of the ACK/NACK fed back from the UE. In another embodiment of the present invention, the ACK/NACK repetition factor may also adjusted according to the CQI fed back from the UE.

The TB size determiner 1008 determines a TB size to be used for the packet to be transmitted over the HS-PDSCH. The MUX 1022 generates a bit stream in a slot format by multiplexing the CCS information (or the ACK/NACK repetition factor), the MS information, the NI, the HARQ process ID, the RV information, and the TB size information.

The CRC coder 1024 attaches a (CRC) Cychic Redundancy Check code to the bit stream. The CRC may be masked with a UE ID. The SPC 1026 converts the CRC-attached bit stream to parallel information bits and outputs them separately as an in-phase (I) part and a quadrature-phase (Q) part to the spreader 1028.

The spreader 1028 generates an I channel signal and a Q channel signal by spreading the I part and the Q part with a predetermined spreading code COVSF. The adder 1030 adds the I channel signal and the Q channel signal and output the resulting complex signal to the scrambler 1032. The scrambler 1032 scrambles the complex signal with a predetermined scrambling code CScramble.

The channel gain controller 1034 multiplies the scrambled signal by a channel gain. The modulator 1036 modulates the gain-controlled signal in a predetermined modulation scheme. The RF module 1038 upconverts the modulated signal to an RF signal and transmits it through the antenna.

The receiver includes an antenna, an RF module 1042, a demodulator 1044, a descrambler 1046, an UQ stream generator 1048, multipliers 1050 and 1052, a channel compensator 1054, a parallel-to-serial converter (PSC) 1056, a CRC decoder 1058, a demultiplexer (DEMUX) 1060, and a control information interpreter 1062. The RF module 1042 and the CRC decoder 1058 correspond to a physical layer and can be collectively called "channel receiver". The DEMUX 1060 and the control information interpreter correspond to an upper layer for the physical layer and can be collectively called "controller".

The RF module 1042 downconverts an RF signal received through the antenna to a baseband signal. The demodulator 1044 demodulates the baseband signal in accord with the modulation scheme used in the Node B. The descrambler 1046 descrambles the demodulated signal with the predetermined scrambling code CScramble to output a complex signal. The I/Q stream generator 1048 separates the complex signal into an I bit stream and a Q bit stream.

The multiplier 1050 multiplies the I bit stream by the predetermined scrambling code COVSF to output a despread signal. Likewise, the multiplier 1052 despreads the Q bit stream by the predetermined scrambling code COVSF to output a despread signal. The channel compensator 1054 compensates for the distortion of the despread signals caused during transmission over a radio channel. The PSC 1056 serializes the compensated signals to output a serial signal.

The CRC decoder 1058 checks the CRC of the serial signal from the PSC 1056. If no errors are detected, the CRC decoder 1058 outputs a bit stream (i.e., the serial signal minus a CRC code) to the DEMUX 1060. The DEMUX 1060 demultiplexes the bit stream into CCS information (or ACK/NACK repetition factor information), MS information, NI information, RV information, an HARQ process ID, and TB size information.

The control information interpreter 1062 interprets the control information from the DEMUX 1060 to receive a corresponding data packet. According to the present invention, using the CCS table illustrated in FIG. 5, the control information interpreter 1062 determines whether received information is the CCS information (or the ACK/NACK repetition factor information). If the received information is the CCS information, spreading codes to be used for despreading the data packet are determined and provided to an HS-PDSCH receiver.

On the other hand, if the received information is the ACK/NACK repetition factor information, an ACK/NACK repetition factor is determined and provided to an HS-DPCCH transmitter. Depending on the existence of a packet error, the HS-DPCCH transmitter transmits an ACK or NACK to the Node B by the determined ACK/NACK repetition factor.

What is claimed:

1. An apparatus for transmitting control information in a wireless communication system, the apparatus comprising:
    a controller for determining ACK/NACK repetition factor information based on uplink channel conditions from a receiver to the apparatus; and
    a channel transmitter for transmitting the ACK/NACK repetition factor information over a control channel to the receiver;
    wherein the ACK/NACK repetition factor information indicates a number of times transmission of an ACK/NACK is repeated at the receiver.

2. The apparatus of claim 1, wherein the ACK/NACK repetition factor information is one of reserved values of a Channelization Code Set (CCS).

3. The apparatus of claim 1, wherein the control channel is a High Speed Shared Control Channel (HS-SCCH).

4. The apparatus of claim 1, wherein the controller monitors an error in an ACK/NACK fed back from the receiver to determine the channel conditions.

5. An apparatus for receiving control information in a wireless communication system, the apparatus comprising:
    a channel receiver for demodulating signal received from a transmitter over a control channel to obtain ACK/NACK repetition factor information that is based on uplink channel conditions from the apparatus to the transmitter; and
    a controller for determining a number of times transmission of an ACK or a NACK is repeated based on the ACK/NACK repetition factor information from the channel receiver, wherein the ACK or the NACK is transmitted according to existence of an error in a received packet at the receiver.

6. The apparatus of claim 5, wherein the ACK/NACK repetition factor information is one of reserved values of a Channelization Code Set (CCS).

7. The apparatus of claim 5, wherein the control channel is a High Speed Shared Control Channel (HS-SCCH).

8. A method for transmitting control information in a wireless communication system, the method comprising the steps of:
    monitoring, at a transmitter, an ACK/NACK fed back from a receiver to determine if an ACK/NACK repetition factor needs to be adjusted based on uplink channel conditions from the receiver to the transmitter;
    determining, at the transmitter, the ACK/NACK repetition factor if adjustment is needed; and
    transmitting control information corresponding to the ACK/NACK repetition factor from the transmitter to the receiver over a control channel;
    wherein the control information corresponding to the ACK/NACK repetition factor indicates a number of times transmission of the ACK/NACK is repeated at the receiver.

9. The method of claim 8, wherein the ACK/NACK repetition factor is adjusted when the error frequency of an ACK/NACK for a time period is equal to or greater than a predetermined threshold.

10. The method of claim 8, wherein the ACK/NACK repetition factor is adjusted when errors are successively detected from a predetermined number of ACK/NACK data.

11. The method of claim 8, wherein the control information corresponding to the ACK/NACK repetition faction factor is one of reserved values of a Channelization Code Set (CCS).

12. The method of claim 8, wherein the control channel is a High Speed Shared Control Channel (HS-SCCH).

13. A method for receiving control information in a wireless communication system, the method comprising the steps of:
    demodulating a signal received at a receiver from a transmitter over a control channel to obtain ACK/NACK repetition factor information that is based on uplink channel conditions from the receiver to the transmitter; and
    determining a number of times transmission of an ACK or a NACK is repeated at the receiver based on the ACK/NACK repetition factor information, wherein the ACK or the NACK is transmitted according to existence of an error in a received packet at the receiver.

14. The method of claim 13, wherein the control channel is a High Speed Shared Control Channel (HS-SCCH).

15. The method of claim 13, wherein the ACK/NACK repetition faction factor information is one of reserved values of a Channelization Code Set (CCS).

16. A wireless communication system comprising:
    a controller of a transmitter for determining ACK/NACK repetition factor information based on uplink channel conditions from a receiver to a transmitter; and
    a channel transmitter of the transmitter for transmitting the ACK/NACK repetition factor information from the transmitter to the receiver over a control channel;
    a channel receiver of the receiver for demodulating a signal received over the control channel to obtain the ACK/NACK repetition factor information; and
    a controller of the receiver for determining a number of times transmission of an ACK or a NACK is repeated based on the ACK/NACK repetition factor information, wherein the ACK or the NACK is transmitted according to existence of an error in a received packet at the receiver.

* * * * *